United States Patent [19]

Heal

[11] Patent Number: 4,547,666

[45] Date of Patent: Oct. 15, 1985

[54] MARK ARRAY SENSE READER WITH SEQUENTIAL OUTPUT SIGNALS

[75] Inventor: David Heal, Iowa City, Iowa

[73] Assignee: National Computer Systems, Inc., Eden Prairie, Minn.

[21] Appl. No.: 459,285

[22] Filed: Jan. 19, 1983

[51] Int. Cl.[4] .............................................. H04N 3/02
[52] U.S. Cl. .................................. 250/227; 250/566; 358/200
[58] Field of Search ................ 250/227, 222.1, 223 B, 250/566, 567, 568; 350/96.24, 96.25, 96.26, 96.27, 96.28; 358/200

[56] References Cited

U.S. PATENT DOCUMENTS

| | | | |
|---|---|---|---|
| 3,588,258 | 6/1971 | Sendt | 250/223 B |
| 3,771,325 | 11/1973 | Sweeney et al. | 250/222.1 |
| 3,800,149 | 3/1974 | Lang | 250/227 |
| 3,987,301 | 10/1976 | O'Connor | 250/227 |
| 3,999,062 | 12/1976 | Demsky et al. | 250/227 |
| 4,222,630 | 9/1980 | Delignieres | 250/227 |
| 4,254,331 | 3/1981 | Dorman et al. | 250/227 |
| 4,409,477 | 10/1983 | Carl | 250/227 |

Primary Examiner—David C. Nelms
Assistant Examiner—J. Jon Brophy
Attorney, Agent, or Firm—Dorsey & Whitney

[57] ABSTRACT

The reading head of an optical reading system for determining the presence or absence of marks on the surface of a document consists of an array of the single ends of a plurality of bifurcated light fibers. The first and second branches of the bifurcated ends of each light fiber are arranged in serial arrays. A single light source and a single light detector sequentially interface with the first and second branches respectively of the light fibers with the light source transmitting light through the first branch and the light detector generating a signal indicative of the light level reflected from the document surface through the second branch. The sequential signals generated by the light detector are processed to determine the information content of the document.

5 Claims, 3 Drawing Figures

MARK ARRAY SENSE READER WITH SEQUENTIAL OUTPUT SIGNALS

BACKGROUND OF THE INVENTION

In many conventional mark reader systems, a single light source is employed to illuminate an entire document and the light reflected or transmitted from discrete locations on the document is monitored by a plurality of light detecting devices positioned relative to each of the document locations. The signal developed by each of the light detecting devices provides an indication of the presence or absence of a mark at the corresponding document location. The accuracy of such a system is dependent upon the electronics associated with each of the light detecting devices, and the uniform document illumination from the light source.

SUMMARY OF THE INVENTION

There is described herein with reference to the accompanying drawing a simplified mark sense reader implementation wherein a single point light source and a single light detecting device sequentially traverse pairs of bifurcated elements of each light fiber of an array of light fibers comprising a document reading station. The use of a single concentrated light source to transmit light through each fiber optic element sequentially eliminates the problem of providing total document uniform lighting. The use of a single light detecting device to monitor the reflected light from a discrete location on the document provides a simplified approach for sequentially determining the presence or absence of a mark at a plurality of document locations monitored by light fibers.

BRIEF DESCRIPTION OF THE DRAWING

The invention will become more readily apparent from the following exemplary description in connection with the accompanying drawing.

DESCRIPTION OF THE PREFERRED EMBODIMENT

Figure 1:
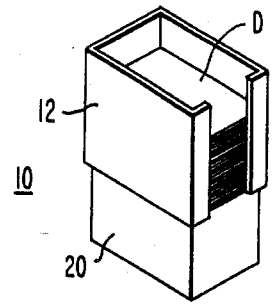
FIG. 1 is an illustration of a top feeding document reader system having a reading station employing the invention.
Figure 2:
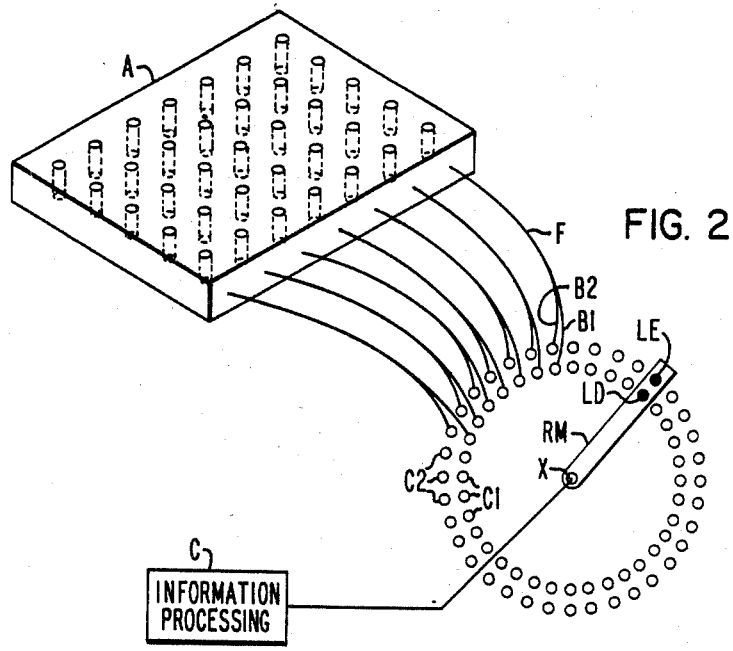
FIG. 2 is a schematic embodiment of the invention included in FIG. 1 wherein the combination of a single light source and a single light detecting element are affixed to a rotatable member having an axis of rotation about which the bifurcated elements of each light fiber are coaxially disposed.
Figure 3:
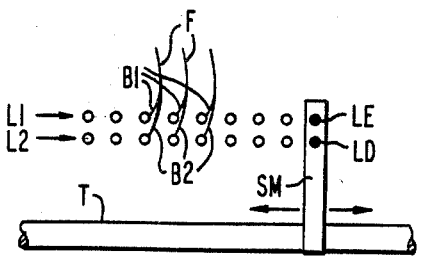
FIG. 3 is a schematic illustration of an embodiment of the invention wherein the single light source and the single light detecting device are affixed to a member which linearly traverses the bifurcated elements of the light fiber elements comprising the document read head.

While the following discussion, with reference to FIGS. 1–3 assume stationary arrays of bifurcated light fibers and a movable member supporting the single light source and single light detecting element, it will be apparent from the following discussion that all that is required is relative movement whereby the combination of the light source and light detector sequentially interface with the bifurcated elements of each light fiber element comprising a document reading head.

Referring to FIG. 1, there is schematically illustrated a document mark reading apparatus 10 including a top feeding hopper 12 and a document reading station 20. The documents D are positioned in the top feeding hopper 12 in a face-down position such that the mark information present on the surface of the document at the base of the stack is read by the reading head of the station 20. The document may be one of many information formats such as a student answer sheet, a customer order form, inventory information sheet, etc. After each document is read, the document is removed from the bottom of the stack and the next document is in position to be read.

A typical implementation of the reading head of the document station 20 is illustrated in FIG. 2 as consisting of a plurality of light fibers F forming a reading head array A corresponding to the surface of the document to be read. The single end of each light fiber F forming the array A functions to detect the presence or absence of a mark at a discrete location on the surface of the document. The opposite end of each light fiber F is bifurcated. The branches B1 and B2 of the bifurcated light fibers F form concentric circles C1 and C2, respectively, with the inner circle C1 comprised of branch B1 of each bifurcated light fiber F and the outer circle C2 comprised of branch B2 of the bifurcated light fibers F. A rotor member RM is rotatably mounted at the axis of the concentric circles C1 and C2 and includes a light emitting element LE and a light detecting element LD positioned such that the light emitting element LE aligns with the outer circle C2 of the light fiber branches B2 and the light detecting element LD aligns with the branches B1 comprising the inner circle C1. The electrical leads associated with the light emitting device LE, which may typically be a light emitting diode, and the light detecting device LD, which may be typically a phototransistor, extend along the rotor member R to the axis of rotation X from which they are connected to suitable excitation energy for the light emitting device LE and signal processing circuitry associated with the light detecting device LD. As the rotor member R rotates sequentially to each pair of branch elements of the bifurcated light fibers F, the light emitting device LE transmits light energy through the branch B2 of the light fiber F to the document reading station 20 for illuminating the corresponding discrete portion of a document. The level of light reflected from the document, as an indication of the presence or absence of a mark, is transmitted back through the light fiber F and branch B1 and is monitored by the light detecting element LD. The utilization of a single concentrated light source located at one point along the radius of the rotor member R corresponding to the radius of the circular array of C2 of the bifurcated branches B2, and the light detecting device LD located at a second point on the radius of the rotating member RM corresponding to the radius of the circular array C1 of the bifurcated branches B1 provides a simple and reliable arrangement for reading mark information from a document on a point-by-point basis. This arrangement eliminates the need for a plurality of light detecting circuitry associated with the individual light fibers F, and eliminates the requirement for uniformly illuminating the total surface of the document. The serial yes-no mark sense information developed from the sequential reading of each document location associated with the individual light fibers of the document reading station array A is supplied to a suitable information processing circuit C.

A variation to the embodiment illustrated in FIG. 2 is schematically illustrated in FIG. 3 wherein the bifurcated ends of the light fibers F are arranged in parallel, linear arrays L1 and L2 with the light emitting element LE and the light detecting element LD affixed to a support member SM which linearly traverses the bifurcated branches B1 and B2 of arrays L1 and L2 along a track T.

What we claim is:

1. In an optical reading system for determining the presence or absence of mark information at a plurality of discrete mark information locations on a document, the combination of,
   a document reading head array having a plurality of discrete mark reading locations which have a one-to-one correspondence with the discrete mark information locations on said document,
   a plurality of bifurcated light fibers, each fiber having one bifurcated end with first and second branches and one single end, the single ends of said light fibers being arranged to form the mark reading locations of said reading head array, with each single end functioning to detect the presence or absence of a mark at a discrete mark information location on the surface of the document contacting the reading head array, the first and second branches of the bifurcated ends of each light fiber being arranged in pairs in a serial array,
   a mark sensor means having a single light source and a single light detector for sequentially interfacing with the pairs of first and second branches of each light fiber, said light source introducing light into the first branch and said light detector generating sequential output signals indicative of the light level reflected back from the document through the second branch and of the presence or absence of a mark at each mark information location, and
   information processing means responding to the sequential output signals developed by said light detector means to process the mark information present at the discrete mark information locations on the surface of a document contacting the reading head array.

2. In a system as claimed in claim 1 wherein said serial arrays of said first and second branches are concentric circle arrays, and said mark sensor means consists of a rotor member rotatably mounted at the axis of the concentric circle arrays, with said light source being mounted on said rotor member so as to align with the first branches and the light detector being mounted on said rotor member so as to simultaneously align with the second branches of the respective light fibers as the rotor member sequentially advances.

3. In a system as claimed in claim 1 wherein said serial arrays of said first and second branches are parallel, linear arrays.

4. In a system as claimed in claim 1 wherein said light source is a light emitting diode.

5. In a system as claimed in claim 1 wherein said light detector is a phototransistor.

* * * * *